J. A. LA BONTE.
WIND SHIELD.
LICATION FILED JUNE 13, 1914.
1,184,652.
Patented May 23, 1916.
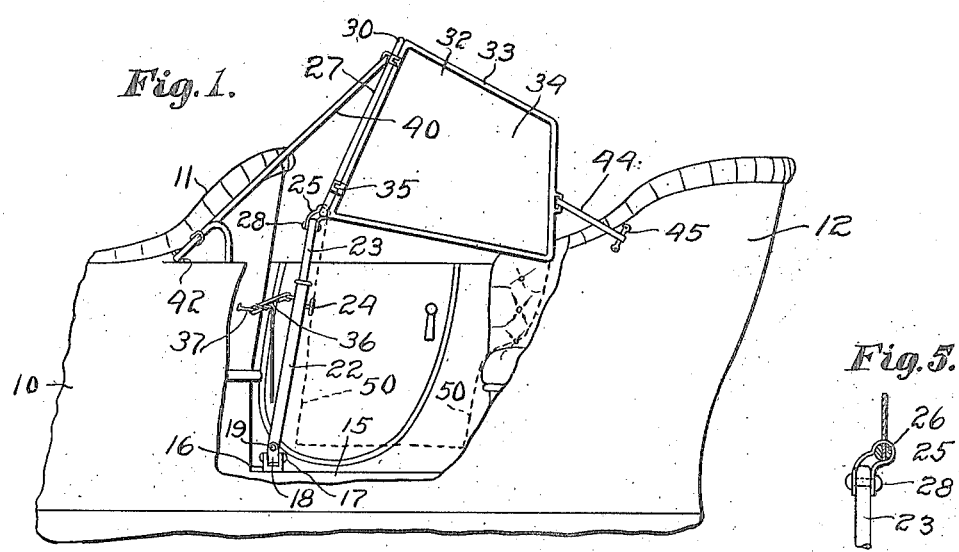
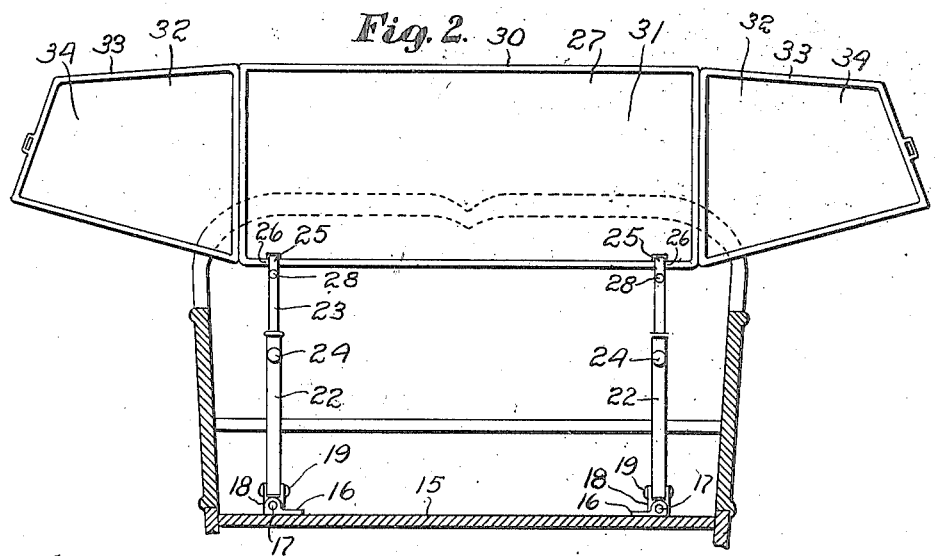
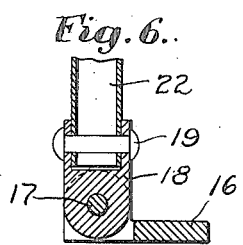
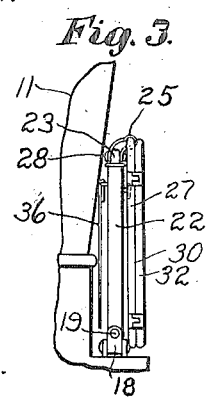
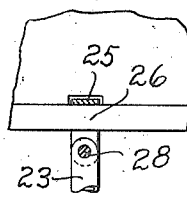
Witnesses:
Maud C. Organ
Fred W. McArdle
Inventor:
Joseph A. La Bonte,
by Edwin P. Liner
Atty.

UNITED STATES PATENT OFFICE.

JOSEPH A. LA BONTE, OF CAMBRIDGE, MASSACHUSETTS.

WIND-SHIELD.

1,184,652.     Specification of Letters Patent.     Patented May 23, 1916.

Application filed June 13, 1914. Serial No. 844,921.

*To all whom it may concern:*

Be it known that I, JOSEPH A. LA BONTE, a citizen of the United States, and a resident of Cambridge, county of Middlesex, State of Massachusetts, have invented an Improvement in Wind-Shields, of which the following description, in connection with the accompanying drawing, is a specification, like characters on the drawing representing like parts.

This invention relates to wind shields and pertains more particularly to wind shields to be located to the rear of the front seat of the tonneau of an automobile and capable of being adjusted toward and from the rear seats to protect the occupants therein.

In order to illustrate my invention I have shown in the accompanying drawing one embodiment thereof, wherein;

Figure 1 is a side elevation of an automobile tonneau with a part of the side broken away, to show a side elevation of my invention and the application thereof. Fig. 2 is a view transverse to Fig. 1 with the side wings extended in the same plane as that of the central panel of the wind shield. Fig. 3 is a detail showing the wind shield in its folded position. Figs. 4, 5 and 6 are details of pivots or hinges to be hereinafter described.

The terms employed herein are used in the generic and description sense and not primarily for the purpose of imposing limitations upon my invention. Limitations of my invention will be pointed out in the appended claim.

In the drawing 10 represents the tonneau body of an automobile having the usual front or driver's seat 11 and the rear or passenger seats 12.

Usually the occupants of the front or driver's seat are fully protected by a wind shield erected upon the dash forming a part of the body, while the occupants of the rear or passenger seats are afforded little or no protection against the wind or dirt blown in the faces of the passengers. Therefore between the front seat 11 and the rear seat 12 I preferably provide a wind shield that can be adjusted up, down sidewise or at any inclination desired.

To the floor 15 of the tonneau are hinge members 16 having a pivot 17 engaging a plate 18 having a pivot pin 19 above the pivot pin 17 and at right angles thereto. The pivot pin 19 passes through the lower end of an upwardly extending tubular member 22.

Slidable within the tubular member 22 is a rod 23 adapted to be clamped in any desired vertical position by means of the set screw 24. At the top of the rod 23 I preferably provide a strap 25 encircling a rounded portion 26 on the central panel 27 of the wind shield. The said strap 25 extends downward along the sides of the rod 23 and is provided with a pivot pin 28 at right angles to the bearing surface 26. Therefore the tubular member 22 and rod 23 form telescopic means for raising and lowering the central panel 27 and at the same time the center panel can be turned in any angular position with respect to the rod 23 or to the hinge members 16 thereby providing a universal joint construction at both the upper and lower ends of the wind shield support.

The center panel 27 comprises the usual frame 30 and glass or transparent celluloid member 31 so that the occupants of the tonneau seat 12 may be protected from the wind and from dirt and at the same time the roadway and view is unobstructed. At each side of the center panel 27 I preferably provide side wings 32—32 each comprising a frame 33 and a transparent member 34 hinged at 35 to the central panel 27. This construction provides deflecting panels or wings to practically inclose the occupants of the tonneau seat on three sides thereby forming a most effective shield or guard. Tie straps 36 extending from the sleeves 22 to rings 37 or other suitable anchoring construction upon the front or driver seat 11 provide means for securing the said sleeve and the rod 23 in the desired angular position. These said tie straps may be adjusted so as to permit the said sleeve on the said rod to be adjusted to any angle with respect to the passengers' seat 12. Tie straps 40 secured to the central panel 27 near the top thereof at each end are likewise strapped to the rings 42 or the like and permit the said central panel and said wings to be adjusted to any desired degree of inclination with respect to the tubular members 22. The said wings are secured in position parallel to the sides of the body 10 by straps 44 extending rearwardly and secured to rings 45 or the like or to buttons on the rear or passenger seat 12 and thereby hold the said side wings 32—32 in position.

The straps 36, 40 and 44 may be of any suitable nature best adapted for the purpose and are held to the respective anchor means by means of buckles or snap hooks or any other suitable means to permit said tie straps to be quickly attached and detached and at the same time allow for adjustment in the length of the strap. Such features as these are well known in the art and further description or illustration is unnecessary to an understanding of such devices except that broadly any desired form of tie strap and connections may be employed.

If desired depending flexible curtains as shown in the dotted lines 50 may be secured to the central panel 27 and to the side wings 32—32 so that if the entire wind shield is adjusted closely to the occupants of the passenger seat said curtain can be extended down over the lower portion of the body to keep dust and dirt from the clothing.

By means of the telescopic construction consisting of the sleeve 22 and the rod 23 the entire wind shield can be adjusted to such height as to permit the passengers to look over the top of the shield. In addition to this the universal joint or hinged support construction for the wind shield, one side thereof can be lowered or raised above the level of the other side so that a shorter or taller person on that side will not be obliged to look through the wind shield while a companion may look over the top edge.

Heretofore wind shields have not been capable of having the top edge thereof adjustable from the horizontal position. Therefore this invention provides a very efficient means to adjust the wind shield to any degree of inclination and permit the top edge thereof to be adjusted out of the horizontal or to any degree of inclination. In other words the wind shield may be brought up close to the occupants of the tonneau seat and be so inclined as to project the wind over the passenger's heads by varying the degree of inclination and at the same time the top edge thereof may be so adjusted to permit persons of different heights to obtain a clear view of the roadway over the top of the wind shield. It will be noted also that there are no rods or other rigid parts secured to the seat 11 and projecting straight toward the bodies of the passengers on the rear seat 12. Such construction presents a source of danger to the occupants of the said seat 12 in that the sudden stopping of the car frequently impels such persons forward and there is great danger of such projections puncturing the body. Therefore the supports for this wind shield are so spaced that there is very little danger of a person being thrown against projecting parts and in the case of the sudden stopping of the car for any reason whatsoever, the occupants of the rear seat will be inclosed in a guard frame that will produce no greater injuries than bruises or abrasions upon contacting therewith.

By using snap hooks on the ends of the tie straps 44 the occupants of the tonneau seat have merely to unhook such snap hooks from the rings 45 and swing the entire wind shield forward out of the way in order to get out of or into the tonneau.

When it is not desired to use the wind shield the side wings can be folded inwardly against the frame 30 and by releasing the tie straps 40 the entire wind shield can be folded inwardly and downwardly behind the seat 11. By releasing the set screws 24 the wind shield can be then lowered so as to present but very little obstruction within the tonneau.

No special fitting or cutting of the tonneau body is necessary by the use of my invention as the main portions of the wind shield supports are out of sight and are only secured to the floor of the car. The tie straps, etc., may be so arranged that they will button to other projections existing upon the body of the tonneau for the purpose of attaching curtains or a canopy top thereto.

By means of this invention the application thereof is not confined solely to its use on automobiles but it may be used with equal effect when placed in motor boats or any other type of vehicles or carriers.

I have described herein one embodiment of my invention; but it is to be understood that the latter is not essentially limited to the specific details of construction and organization of said embodiment, since the same may be varied without departing from the proper scope of the claim.

I claim:

In a wind shield of the character described, a central panel, side wings pivoted thereto, a pair of independent supporting members one at each end of said central panel and adapted to be adjusted one independently of the other each being capable of adjustment to any inclination both longitudinally and transversely, and independent members secured to the top of the central panel and adapted to adjust the angle of the same relative to the said supports.

In testimony whereof, I have signed my name to this specification, in the presence of two subscribing witnesses.

JOSEPH A. LA BONTE.

Witnesses:
MAUD E. ORGAN,
EDWIN T. LUCE.